United States Patent [19]
Kaneishi et al.

[11] Patent Number: 5,626,815
[45] Date of Patent: May 6, 1997

[54] GAS-FEEDING NOZZLE AND APPARATUS AND METHOD EMPLOYING SUCH NOZZLE

[75] Inventors: Akimasa Kaneishi; Shinji Kiboshi, both of Hiratsuka, Japan

[73] Assignee: Mitsubishi Gas Chemical Company, Inc., Tokyo, Japan

[21] Appl. No.: 329,518

[22] Filed: Oct. 26, 1994

[30] Foreign Application Priority Data

Nov. 15, 1993 [JP] Japan .................. 5-285131

[51] Int. Cl.⁶ .................. B29C 44/02; B29C 45/00
[52] U.S. Cl. .................. 264/572; 264/328.12; 425/533; 425/535; 425/546
[58] Field of Search .................. 425/130, 533, 425/546, 564, 535; 264/572, 328.12, 328.8, 328.13

[56] References Cited

U.S. PATENT DOCUMENTS

| | | | |
|---|---|---|---|
| 4,129,635 | 12/1978 | Yasuike et al. | 264/572 |
| 4,905,901 | 3/1990 | Johnson | 264/328.7 |
| 5,044,924 | 9/1991 | Loren | 264/572 |
| 5,149,546 | 9/1992 | Nelson | 264/572 |
| 5,151,278 | 9/1992 | Baxi et al. | 425/130 |
| 5,204,050 | 4/1993 | Loren | 264/572 |
| 5,273,417 | 12/1993 | Nelson . | |

FOREIGN PATENT DOCUMENTS

| | | |
|---|---|---|
| 0283207 | 9/1988 | European Pat. Off. . |
| 0577840 | 1/1994 | European Pat. Off. . |
| 0614742 | 9/1994 | European Pat. Off. . |
| 2716817 | 8/1978 | Germany . |
| 4-31015 | 2/1992 | Japan . |
| 89/05226 | 6/1989 | WIPO . |
| 92/20507 | 11/1992 | WIPO . |
| 93/12919 | 7/1993 | WIPO . |
| 93/14919 | 8/1993 | WIPO . |

*Primary Examiner*—Jay H. Woo
*Assistant Examiner*—Joseph Leyson
*Attorney, Agent, or Firm*—Wenderoth, Lind & Ponack

[57] ABSTRACT

A gas-feeding nozzle is to be used with a mold attached to an injection molding machine and for introducing a pressurized gas into molten resin injected in a cavity of the mold to produce an injection molded article having a hollow structure. A top forward portion of the gas-feeding nozzle is formed of a gas ejection portion having an inner side wall, along a direction of flow of the pressurized gas, having at least one concavo-convex portion.

15 Claims, 17 Drawing Sheets

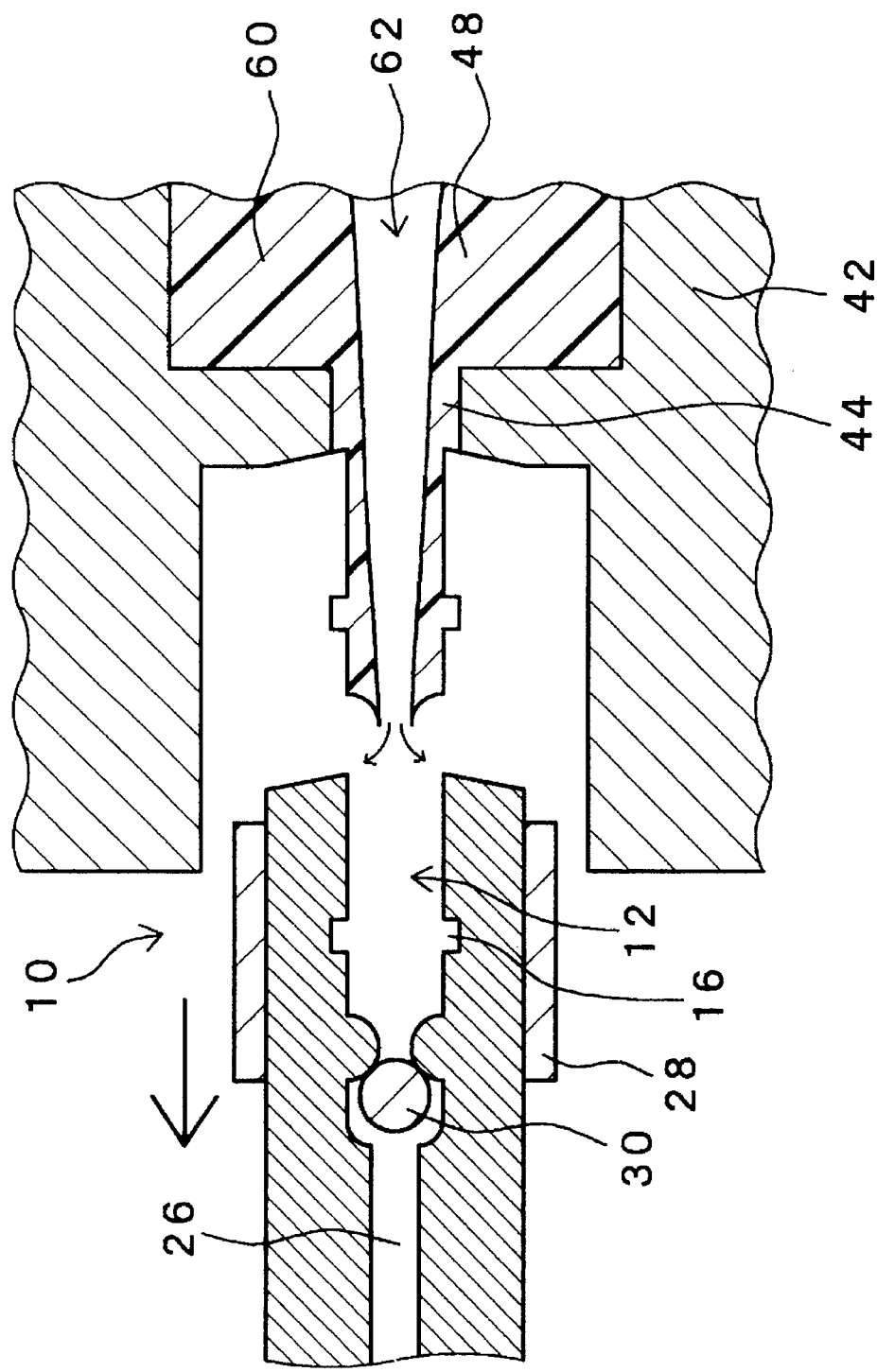

GAS-FEEDING NOZZLE AND APPARATUS AND METHOD EMPLOYING SUCH NOZZLE

BACKGROUND OF THE INVENTION AND RELATED ART

The present invention relates to a gas-feeding nozzle for use in an injection molding machine for the production of an injection molded article having an excellent appearance free of sink marks and distortion. More specifically, it relates to a gas-feeding nozzle for feeding a pressurized gas into a molten resin injected into a cavity of a mold attached to an injection molding machine for producing an injection molded article having a hollow structure.

For example, JP-A-64-14012 (corresponding to U.S. Pat. No. 4,740,150) discloses an injection molding machine for producing a molded article having an excellent appearance. JP-A-64-14012 discloses a method in which a molten thermoplastic resin is injected into a cavity of a mold, then a pressurized gas is introduced into the molten thermoplastic resin in the cavity to form a hollow structure within the thermoplastic resin. Finally, the gas within the hollow structure is released into the atmosphere before the mold is opened.

When the gas-feeding nozzle disclosed in JP-A-64-14012 is used, a gas ejection portion forming a top or forward portion of the gas-feeding nozzle is filled with part of the molten thermoplastic resin injected into the cavity before introduction of the pressurized gas into the molten thermoplastic resin. Then, the pressurized gas is introduced into the molten thermoplastic resin in the cavity through a gas ejection outlet at the top or forward end of the gas ejection portion. In this case, a gas flow path is formed in and along the central line of the molten resin filled in the gas ejection portion forming the top or forward portion of the gas-feeding nozzle as schematically shown in FIG. 17. During the introduction of the pressurized gas, the resin which is semi-molten or undergoing solidification is pressed onto the side inner wall of the gas ejection portion. As a result, the leakage of the pressurized gas through a gap between the gas ejection outlet and the mold can be prevented, and the pressurized gas can be reliably and smoothly introduced into the molten thermoplastic resin in the cavity of the mold. In FIGS. 17 and 18, numeral 100 indicates a conventional gas-feeding nozzle, numeral 112 indicates a gas ejection portion, numeral 120 indicates a gas ejection outlet, numeral 126 is a gas flow passage, numeral 130 is a non-return valve, numeral 42 indicates a movable mold member, numeral 44 indicates a gas inlet portion provided in the movable mold member 42, numeral 48 indicates a cavity, numeral 60 indicates a molten resin, numeral 62 indicates a hollow portion (structure) formed in the molten resin 60.

In the above prior art technique, however, when the pressurized gas is introduced through the gas-feeding nozzle into molten thermoplastic resin in the cavity, a phenomenon of the pressurized gas blowing off the resin filled in the gas ejection portion often takes place depending upon the injection molding conditions such as the type and viscosity of the resin used, pressure of the pressurized gas, introduction timing of the pressurized gas, and the like. This phenomenon will be hereinafter called "blow-off phenomenon", which is schematically shown in FIG. 18. When this phenomenon takes place, there arises the problem that the pressurized gas leaks, so that an injection molded article having an intended hollow structure can be no longer produced.

The blow-off phenomenon can be overcome in some cases by adjusting the pressure of the pressurized gas and the introduction timing of the pressurized gas, while it is often difficult to produce a molded article having an excellent appearance free of sink marks and distortion.

OBJECT AND SUMMARY OF THE INVENTION

It is therefore an object of the present invention to provide a gas-feeding nozzle which makes it possible to smoothly and reliably introduce a pressurized gas into a molten resin injected into a cavity of a mold, under a broad range of injection molding conditions, and which can prevent the blow-off phenomenon.

According to a first aspect of the present invention, there is provided a gas-feeding nozzle for use with a mold attached to an injection molding machine and for introducing a pressurized gas into a molten resin injected into a cavity of the mold to produce an injection molded article having a hollow structure, wherein a top or forward portion of the gas-feeding nozzle is formed of a gas ejection portion whose inner side wall along a flow direction of the pressurized gas has at least one concavo-convex portion. The inner side wall of the gas ejection portion may be formed parallel with the axis of the gas injection nozzle or may be tapered. In the later case, preferably, it may be formed such that the cross-sectional area of the gas ejection portion gradually increases along the flow direction of the pressurized gas.

In one preferred embodiment according to the first aspect of the present invention, the concavo-convex portion 16, 16A is formed of at least one groove portion (see FIGS. 1A and 1B) or at least one projected portion (see FIGS. 6A and 6B) which extends nearly at right angles with the flow direction of the pressurized gas. The groove portion or the projected portion in this embodiment may have a continuous or discontinuous ring form which extends on the inner side wall of the gas ejection portion nearly at right angles with the flow direction of the pressurized gas. Further, when the groove portion or the projected portion is a discontinuous ring, the fragments of the groove portion or the projected portion may be arranged symmetrically or asymmetrically with regard to the axis of the gas-feeding nozzle. Further, the concavo-convex portion may be a combination of the groove portion(s) and the projected portion(s). The depth of the groove portion is preferably 2 to 30% of the inner diameter of the gas ejection portion, or the height of the projected portion is preferably 2 to 30% of the inner diameter of the gas ejection portion. The cross-sectional form of the groove portion or the projected portion, taken by cutting the groove portion or the project portion with a plane including the axis of the gas-feeding nozzle, may have any form as required, such as a rectangular form, a rectangular form with corners thereof removed, a semi-circular form, a semi-oval form, a combination of a straight line and a semi-circular form, a combination of a straight line and a semi-oval form.

In another preferred embodiment according to the first aspect of the present invention, the concavo-convex portion 16B, 16C is formed of at least one groove portion (see FIGS. 7A, 7B, 8A and 8B) or at least one projected portion (see FIGS. 9A, 9B, 10A and 10B) which extends nearly parallel with the flow direction of the pressurized gas. In this embodiment, the groove portion or the projected portion may have a continuous or discontinuous form of a straight or curved line. When a plurality of the groove portions or the projected portions are present, the groove portions or the projected portions may be arranged symmetrically or asymmetrically with regard to the axis of the gas-feeding nozzle. Further, the concavo-convex portion may be a combination of the groove portion(s) and the projected portion(s). The depth of the groove portion is preferably 2 to 30% of the inner diameter of the gas ejection portion, or the height of the projected portion is preferably 2 to 30% of the inner diameter of the gas ejection portion. The cross-sectional form of the groove portion or the projected portion, taken at right angles with the axis of the gas-feeding nozzle, may have any form as required, such as a rectangular form, a rectangular form with corners thereof removed, a semi-circular form, a semi-oval form, a combination of a straight line and a semi-circular form, a combination of a straight line and a semi-oval form.

In another preferred embodiment according to the first aspect of the present invention, the concavo-convex portion 16D, 16E is formed of at least one pit or recess (see FIGS. 11A, 11B, 12A and 12B) or at least one projection (see FIGS. 13A, 13B, 14A and 14B). When a plurality of the pits or the projections are present, they may be arranged symmetrically or asymmetrically with regard to the axis of the gas-feeding nozzle. Further, the concavo-convex portion may be a combination of the pits(s) and the projection(s). The depth of the pit is preferably 2 to 30% of the inner diameter of the gas ejection portion, or the height of the projection is preferably 2 to 30% of the inner diameter of the gas ejection portion. The plane-sectional form of the pit or the projection may have any form as required such as a rectangular form, a polygonal form, a circular form or an oval form. The cross-sectional form of the pit or the projection may have any form as required, such as a rectangular form, a rectangular form with corners thereof removed, a semi-circular form, a semi-oval form, a combination of a straight line and a semi-circular form, a combination of a straight line and a semi-oval form.

In the above embodiments, when the depth or the height of the concavo-convex portion is less than 2% of the inner diameter of the gas ejection portion, the effect on the prevention of the blow-off phenomenon is insufficient. When the depth or the height of the concavo-convex portion exceeds 30% of the inner diameter of the gas ejection portion, it may be difficult to remove an injection molded article from the mold because a cooled and solidified resin in the gas ejection portion is caught by the concavo-convex portion in some cases, which may naturally affect the continuous operation of a molding cycle.

In another preferred embodiment according to the first aspect of the present invention, the concavo-convex portion may be formed of continuous fine pits or recesses and projections by a processing method such as an embossing method. In this embodiment, the depth of the pits or the height of the projections is not specially limited, and even if the concavo-convex portion has the form of fine pits and projections, the blow-off phenomenon can be prevented.

In the gas-feeding nozzle according to the first aspect of the present invention, the concavo-convex portion is formed on the inner side wall of the gas ejection portion along the flow direction of the pressurized gas. As a result, when the pressurized gas flows in resin filled in the gas ejection portion, the concavo-convex portion produces a so-called anchor effect, which can prevent the blow-off phenomenon, i.e., the phenomenon of the pressurized gas blowing off the resin filled in the gas ejection portion.

According to a second aspect of the present invention as shown in FIGS. 15 and 16, there is provided a gas-feeding nozzle 10A for use with a mold attached to an injection molding machine and for introducing a pressurized gas into a molten resin injected in a cavity of the mold to produce an injection molded article having a hollow structure, wherein a top or forward portion of the gas-feeding nozzle is formed of a gas ejection portion 12, the gas ejection portion 12 comprises an inner side wall 14 along a flow direction of the pressurized gas, a gas ejection outlet 20 provided in one end of the inner side wall 14 for outletting the pressurized gas, a rear wall 22A, 22B extending from the other end of the inner side wall 14 and a gas introducing port 24 formed in the rear wall 22A, 22B. A length ($L_1$) of the inner side wall 14 is greater than a distance ($L_2$) between the gas introducing port 24 and the gas ejection outlet 20. The inner side wall 14 may be formed in parallel with the axis of the gas injection nozzle or may be tapered. In the later case, preferably, it may be formed such that the cross-sectional area of the gas ejection portion gradually increases toward the gas ejection outlet 20.

The value ($L_1$–$L_2$) obtained by deducting the distance ($L_2$) between the gas introducing port and the gas ejection outlet from the length ($L_1$) of the inner side wall is preferably 2 to 30% of the inner diameter of the gas ejection portion. When the above value is less than 2% of the inner diameter of the gas ejection portion, the effect on the prevention of the blow-off phenomenon is insufficient. When the above value exceeds 30% of the inner diameter of the gas ejection portion, cooled and solidified resin may build up near the rear wall, and as a result, the introduction of the pressurized gas may be unstable in some cases. The cross-sectional form of the forward surface of the rear wall, taken by cutting the wall with a plane including the axis of the gas-feeding nozzle, may have any form, such as any one of a linear form, a curved form and a stepped form.

In the gas-feeding nozzle according to the second aspect of the present invention, the length ($L_1$) of the inner side wall is greater than the distance ($L_2$) between the gas introducing port and the gas ejection outlet. In the gas ejection portion forming a top or forward portion of the gas-feeding nozzle, therefore, the molten resin is filled up to the rear wall which is located upstream relative to the gas introducing port. As a result, since molten resin filled up to the rear wall located upstream relative to the gas introducing port is present when the pressurized gas is introduced, a so-called anchor effect is achieved to effectively prevent the blow-off phenomenon.

A gas-feeding nozzle of the present invention may comprise a combination of the first aspect of the present invention and the second aspect of the present invention.

In the gas-feeding nozzle of the present invention, a non-return valve is preferably provided upstream to the gas ejection portion. The gas-feeding nozzle of the present invention is connected to a pressurized gas source through tubing. The concavo-convex portion formed on the inner side wall of the gas ejection portion is preferably provided near the non-return valve. In the present specification, "upstream" refers to a direction toward the pressurized gas source side, and "downstream" refers to a direction toward the cavity of the mold.

The gas-feeding nozzle of the present invention is used for producing an injection molded article, by, first, injecting a molten resin into a cavity of a mold until the cavity is fully filled with the molten resin and then introducing a pressurized gas into the molten resin fully filled in the cavity of the mold, or by injecting a molten resin into a cavity of a mold to an extent that the cavity is not fully filled with the molten resin and then introducing a pressurized gas into the molten resin in the cavity, or by injecting a predetermined amount of a molten resin into a cavity of a mold and then further continuing the injection of a molten resin into the cavity while introducing a pressurized gas into the molten resin.

While the resin in the cavity of the mold is cooled and solidified, the introduction of the pressurized gas is continued, whereby an injection molded article having a hollow structure can be formed. When the pressurized gas is introduced, the gas ejection portion forming the top or forward portion of the gas-feeding nozzle is filled with the molten resin.

When cooling and solidification of the resin in the cavity of the mold is finished, the introduction of the pressurized gas is terminated, and a gap is formed between the top or forward end of the gas ejection portion and the mold, for example, by withdrawing the gas-feeding nozzle. As a result, the pressurized gas remaining within the hollow structure formed in the injection molded article is released to the atmosphere, so that deformation of the injection molded article caused by the pressurized gas remaining within the hollow structure can be prevented. Then, the mold is opened, and the injection molded article is taken out of the mold. When the gas-feeding nozzle of the present invention is used, the blow-off phenomenon can be prevented, which can consequently prevent the leakage of the pressurized gas through the gap between the gas ejection portion forming the top or forward end of the gas-feeding nozzle and the mold. Therefore, the pressurized gas can be reliably and smoothly introduced into the molten resin injected in the cavity of the mold.

Heating the gas-feeding nozzle of the present invention with the heating apparatus disclosed in JP-A-4-31015 is effective for preventing clogging of the gas-feeding nozzle with resin and for reliably introducing the pressurized gas.

Although not specially limited, the resin used in an injection molding method with the gas-feeding nozzle of the present invention includes not only general plastics such as a polyolefin resin, a polystyrene resin, an ABS resin, a PVC resin, a methacrylate resin and a fluorine-containing resin but also engineering plastics such as a nylon resin, a saturated polyester resin, a polycarbonate resin, a polyacrylate resin, a polyacetal resin, a polysulfone resin and a modified polyphenylene ether resin. It further includes a polymer alloy which is a combination of the above resins.

The resin may contain a fibrous reinforcement, a filler and a stabilizer.

The conditions for carrying out an injection molding method with the gas-feeding nozzle of the present invention, such as the amount, temperature, pressure and an injection rate of a molten resin, the amount, pressure and feed rate of a pressurized gas to be introduced, time for cooling the mold, etc., differ depending upon the type of resin used and the form of a mold used, etc. Therefore, the above conditions are not uniformly determined, and are controlled as required.

The gas used includes substances which are gaseous at room temperature such as nitrogen gas, carbon dioxide gas, air and helium gas and gases liquefied under high pressure.

BRIEF DESCRIPTION OF THE DRAWINGS

The present invention will be detailed hereinafter with reference to drawings.

FIG. 5 is a schematic cross-sectional view of a gas-feeding nozzle, a movable mold member and cooled and solidified resin in a cavity of a mold, showing a state in which pressurized gas introduced into a molten resin is being released to the atmosphere.

DESCRIPTION OF THE PREFERRED EMBODIMENTS

Example 1

Figure 1A:
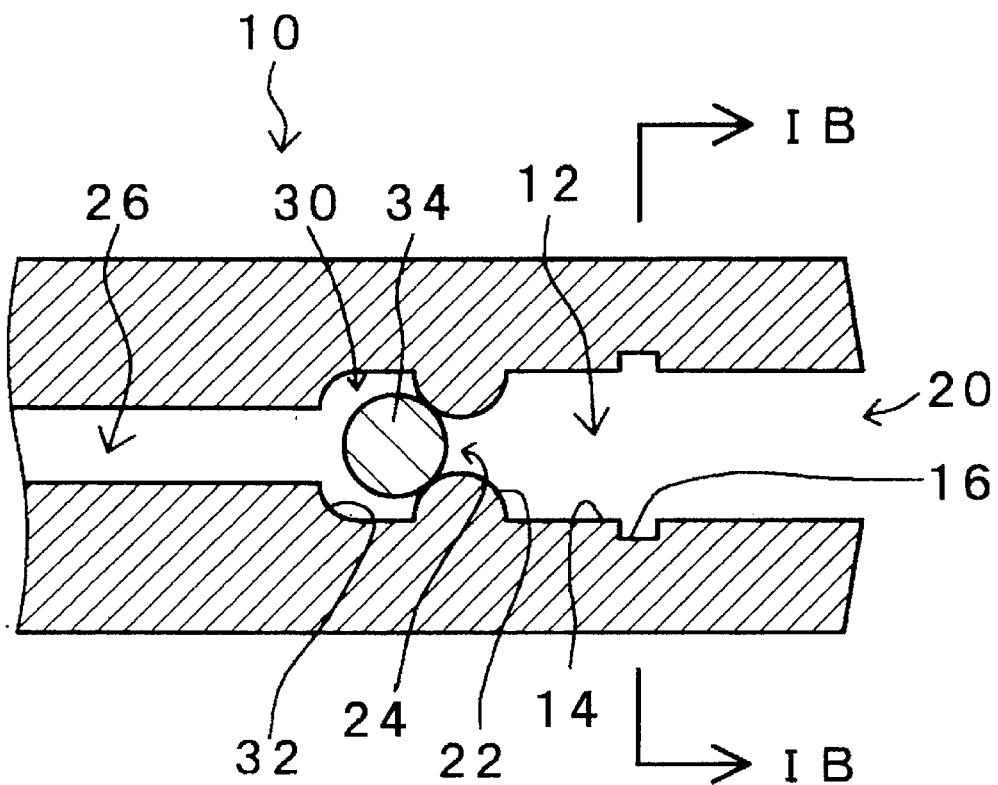
FIG. 1A and FIG. 1B are schematic cross-sectional views of a gas-feeding nozzle of Example 1.
Figure 1B:
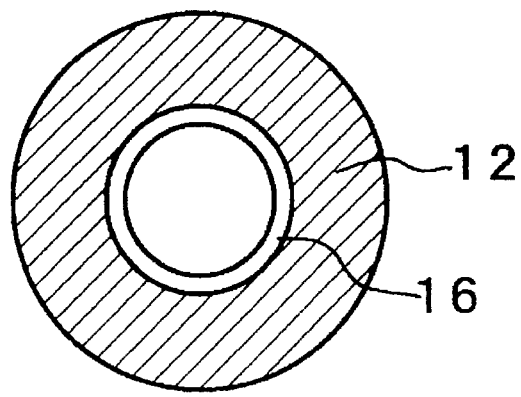

FIG. 1A and FIG. 1B show a gas-feeding nozzle of Example 1 according to a first aspect of the present invention. FIG. 1A is a schematic cross-sectional view of the gas-feeding nozzle, taken along the axis of the gas-feeding nozzle. FIG. 1B is a schematic cross-sectional view of the gas-feeding nozzle, taken along line IB—IB shown in FIG. 1A. In the gas-feeding nozzle of Example 1, a forward portion of a gas-feeding nozzle 10, formed by a member having therethrough a passage, forms a gas ejection portion 12, and a concavo-convex portion or structure 16 is formed on an inner side wall 14 of the gas ejection portion 12 along a direction of flow of pressurized gas through the passage. In Example 1, the surface of the inner side wall 14 is parallel with the axis of the gas-feeding nozzle. The concavo-convex portion 16 is formed of or comprises one groove portion which extends nearly at right angles with the flow direction of the pressurized gas. The groove portion has the form of a ring formed continuously along the circumference of the inner side wall 14 of the gas ejection portion 12. Further, the gas ejection portion 12 has a gas ejection outlet 20 which is provided at one end of the inner side wall 14 and which is used for outletting the pressurized gas, a rear wall 22 extending from the other end of the inner side wall 14 and a gas introducing port 24 formed in the wall 22. In FIG. 1A, numeral 26 indicates a gas flow passage defining an upstream gas introduction portion of the passage formed in a gas inlet portion of the member, and the pressurized gas flows through the gas flow passage 26 from the left hand side to the right hand side as shown in FIG. 1A.

In Example 1, the gas ejection portion 12 has an inner diameter of 5.0 mm, and the groove portion has a depth of 0.15 mm and width of 1.5 mm. The cross-sectional form of the concavo-convex portion 16, taken by cutting the concavo-convex portion 16 by a plane including the axis of the gas-feeding nozzle, was rectangular. The inner side wall 14 of the gas ejection portion 12 has a length of 8.0 mm, and the distance from the gas ejection outlet 20 to the center of the groove portion is 5.0 mm.

The gas-feeding nozzle 10 is provided with a non-return valve 30. The non-return valve is formed of a non-return valve casing portion 32 and a ball 34 of a metal disposed within the non-return valve casing portion 32. A pressurized gas passes the gas flow passage 26, then reaches the non-return valve 30 to move the ball 34 in the right hand direction as shown in FIG. 1A, and is ejected through the non-return valve 30. When a molten resin reversely flows through the gas ejection portion 12 to reach the non-return valve 30 during the injection of the molten resin, the ball 34 is moved in the left hand direction as shown in FIG. 1A, and is pressed to a left wall of the non-return valve casing portion 32. As a result, the non-return valve 30 comes to a closed state and prevents the counter-flow of the molten resin.

Figure 2:
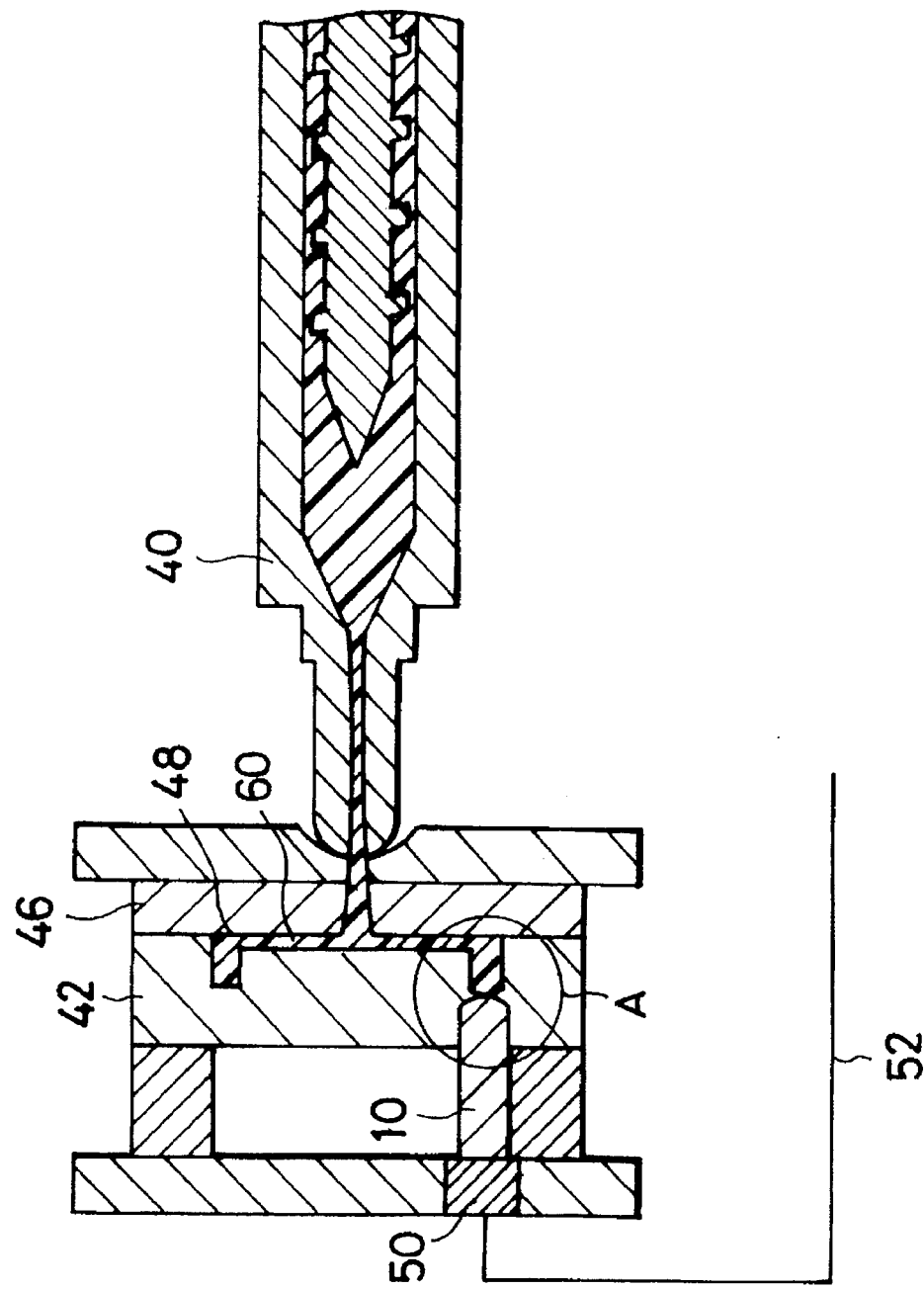
FIG. 2 is a schematic cross-sectional view showing a state in which the gas-feeding nozzle of Example 1 is provided for a mold attached to an injection molding machine.

FIG. 2 schematically shows a state in which the gas-feeding nozzle 10 is provided with a mold attached to an injection molding machine. As shown in FIG. 2, the mold is formed of a movable mold member 42 and a fixed mold member 46. The gas-feeding nozzle 10 may be provided, for example, in the movable mold member 42. The gas-feeding nozzle 10 may be reciprocally moved (in the left and right hand directions as shown in FIG. 2) by moving means 50 formed of a piston and a cylinder attached to the movable mold member 42. In FIG. 2, numeral 52 indicates a gas tubing, of which one end is connected to the gas flow passage 26 of the gas-feeding nozzle 10 and the other end is connected to a pressurized gas source (not shown).

Figure 3:
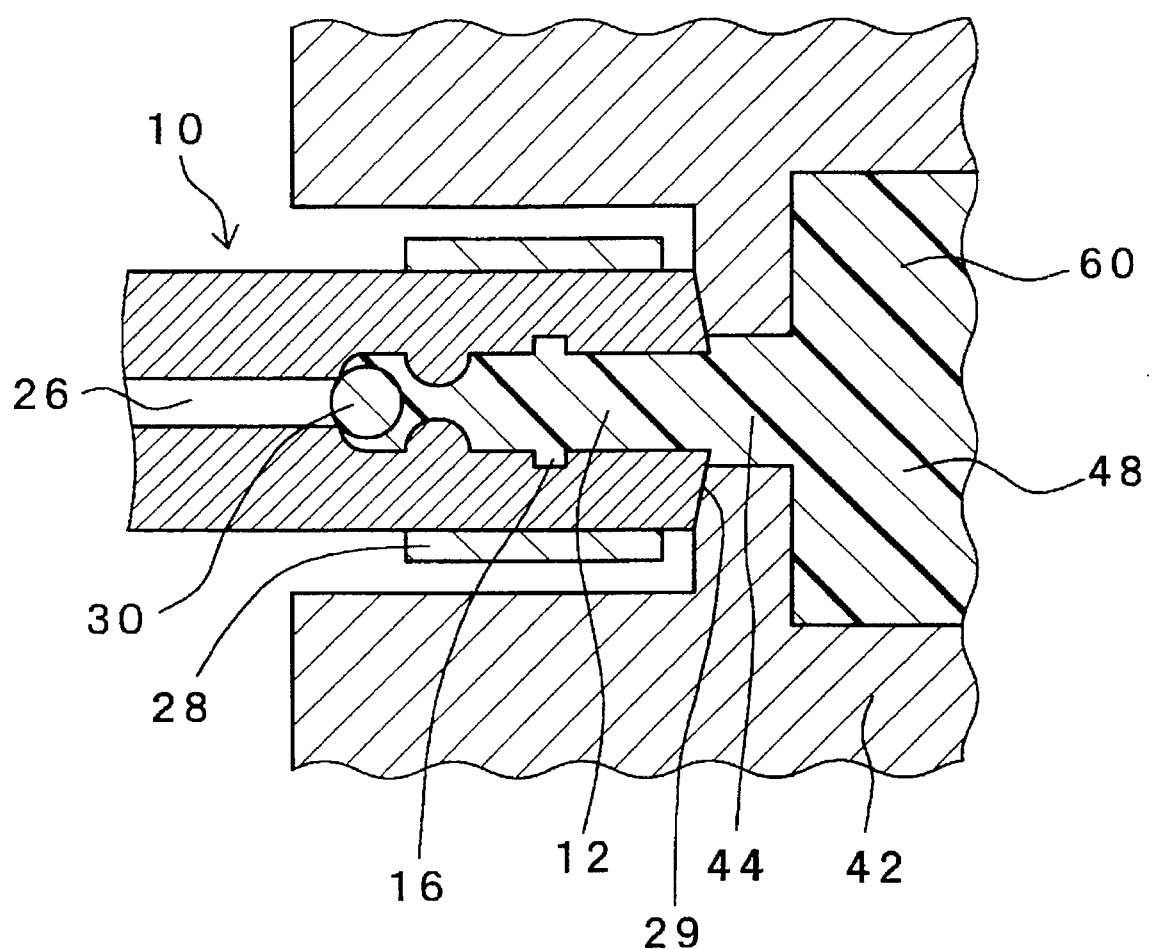
FIG. 3 is a schematic cross-sectional view of a gas-feeding nozzle, a movable mold member and molten resin in a cavity of a mold, showing a state in which the molten resin has been injected into the cavity and pressurized gas has not yet been introduced into the molten resin.

FIG. 3 shows an enlarged view of a portion A shown in FIG. 2.

A gas inlet portion 44 provided in the movable mold member 42 is opened toward a cavity 48 of the mold. When gas-feeding nozzle 10 is moved in the right hand direction as shown in FIG. 2 with the moving means 50, the gas ejection outlet 20 at the top or forward end of the gas ejection portion 12 is brought in close contact with the gas inlet portion 44, so that leakage of a molten resin 60 injected in the cavity 48 of the mold through a gap 29 between the ejection outlet 20 and the movable mold member 42 can be prevented.

FIG. 3 is a schematic cross-sectional view of the gas-feeding nozzle 10, the movable mold member 42 and the molten resin 60 in the cavity 48 of the mold 42, 46, showing a state in which the molten resin 60 has been injected into the cavity 48 and a pressurized gas has not yet been introduced into the molten resin 60. The gas-feeding nozzle 10 is moved to a forward position with the moving means 50, and the top or forward end of the gas-feeding nozzle 10 is in close contact with the gas inlet portion 44 provided in the movable mold member 42. The ejection portion 12 is filled with the molten resin. Numeral 28 indicates a heater for reliable gas feeding. The heater 28 may be provided outside the vicinity of the gas ejection portion 12.

Figure 4:
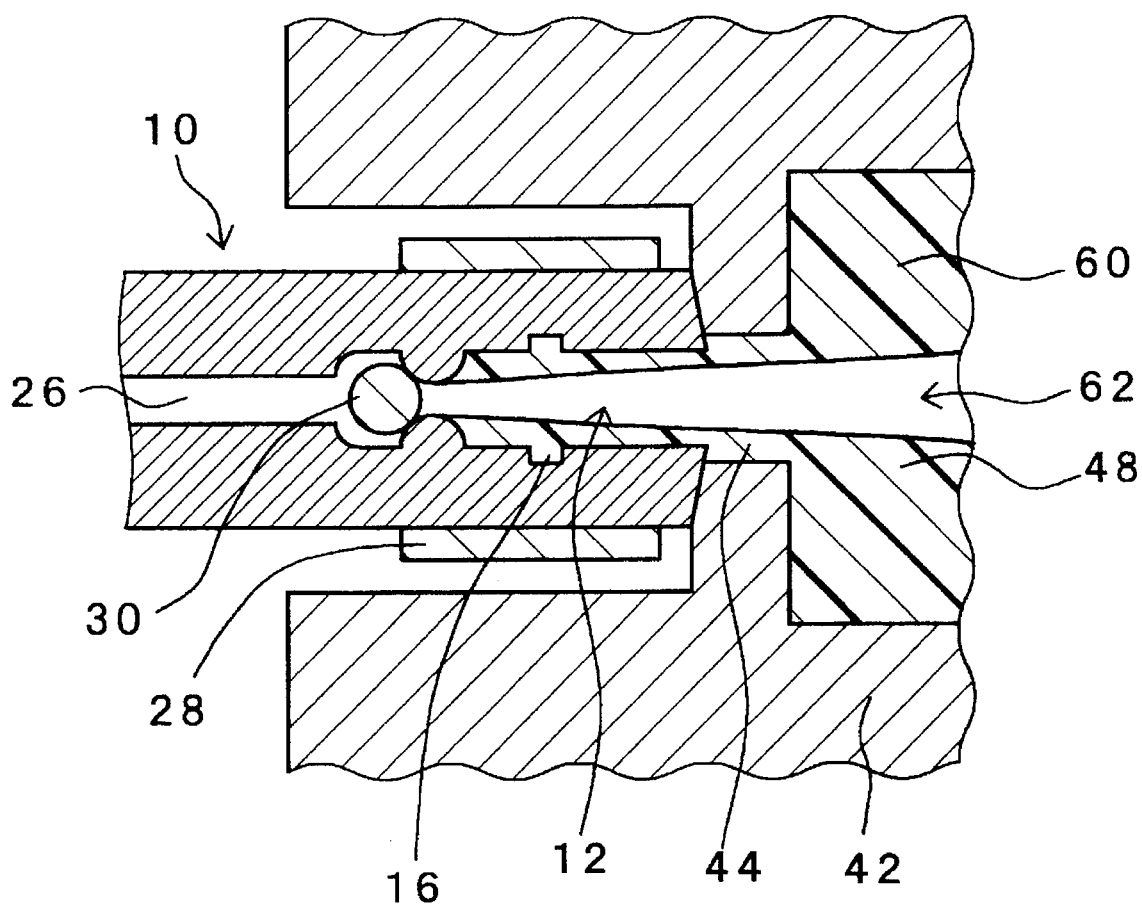
FIG. 4 is a schematic cross-sectional view of a gas-feeding nozzle, a movable mold member and molten resin in a cavity of a mold, showing a state in which pressurized gas is being introduced into the molten resin injected in the cavity of the mold.

FIG. 4 is a schematic cross-sectional view of the gas-feeding nozzle 10, the movable mold member 42 and the molten resin 60 in the cavity 48 of the mold, showing a state in which pressurized gas is being introduced into the molten resin 60 injected in the cavity 48. Due to the introduction of the pressurized gas into the molten resin 60, a hollow structure (hollow portion) 62 is formed in the interior of the molten resin 60. The concavo-convex portion 16 is formed on the inner side wall 14 of the gas ejection portion 12, so that a so-called anchor effect is formed between the resin and portion 12 and effectively prevents the blow-off phenomenon from occurring.

FIG. 5 is a schematic cross-sectional view of the gas-feeding nozzle 10, the movable mold member 42 and the cooled and solidified resin 60 in the cavity 48 of the mold, showing a state in which the pressurized gas introduced into the resin is being released to the atmosphere. The gas-feeding nozzle 10 is moved to a backward position with the moving means 50, and the top or forward end of the gas-feeding nozzle 10 is apart from the gas inlet portion 44 of the movable mold member 42. As a result, the pressurized gas introduced into the resin is released to atmosphere.

The movable mold member 42 was moved to clamp the mold, and then the gas-feeding nozzle 10 was moved with the moving means 50 to bring it into close contact with the gas inlet portion 44 of the movable mold member 42. Then, a polycarbonate resin (trade name: Iupilon S3000R, natural color, supplied by Mitsubishi Gas Chemical Co., Inc.) was plasticized and melted in injection molding cylinder 40 of an injection molding machine at a resin temperature of 280° C. The molten polycarbonate resin (molten resin 60) was injected into the cavity 48 at an injection pressure of 1130 kgf/cm$^2$-G. 3.0 seconds after the initiation of the injection, the injection operation was discontinued, and then, a compressed nitrogen gas as a pressurized gas was introduced into the molten resin 60 in the cavity 48 through the gas-feeding nozzle 10 under a pressure of one of three levels of 80, 130 and 180 kgf/cm$^2$-G to form a hollow structure in the molten resin 60. The resin was cooled for 60 seconds, and then, the pressurized gas was released to atmosphere by moving the gas-feeding nozzle 10 backward with the moving means 50. Then, the mold was opened, and an injection molded article was taken out. The injection molded article had a hollow structure in its thick wall portion, and the gas-feeding nozzle 10 achieved its full function. When the pressurized gas was introduced under a pressure of any one of the above three levels, no blow-off phenomenon was found.

Comparative Example 1

Injection molding was carried out under the same conditions as those in Example 1 except that the gas-feeding nozzle was replaced with one having no concavo-convex portion 16. When the pressurized gas was introduced at 80 kgf/cm$^2$-G, the blow-off phenomenon sometimes took place. When the pressurized gas was introduced at 130 and 180 kgf/cm$^2$-G, the blow-off phenomenon took place each time.

Example 2

Figure 6A:
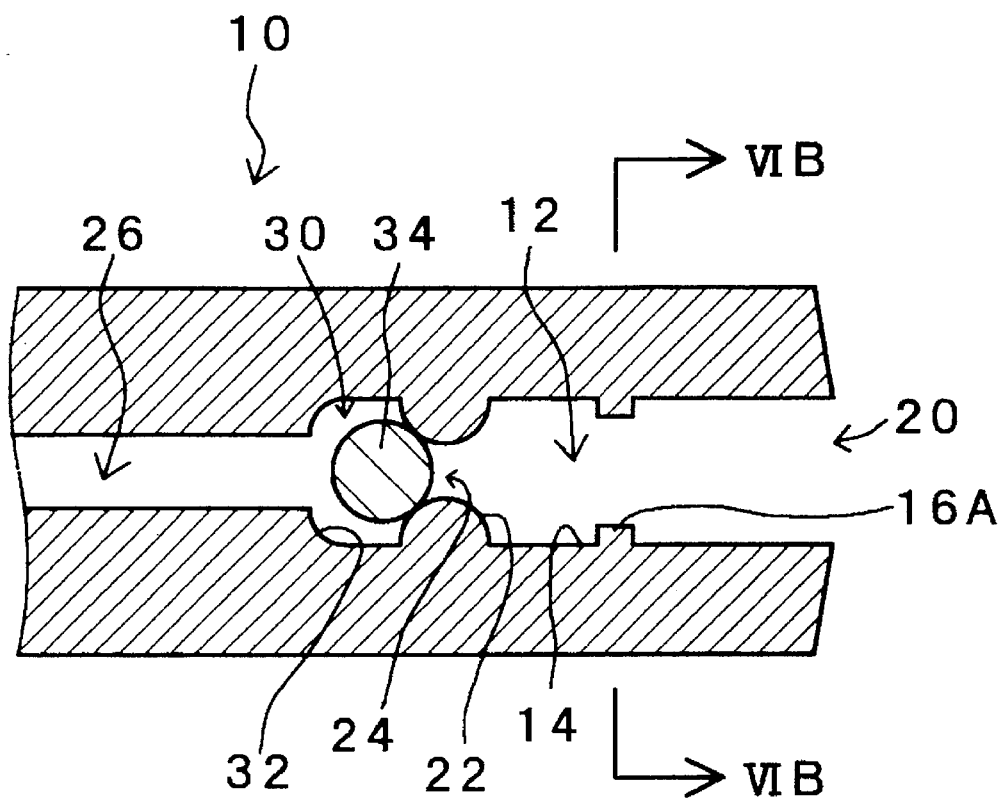
FIG. 6A and FIG. 6B are schematic cross-sectional views of a gas-feeding nozzle of Example 2.
Figure 6B:
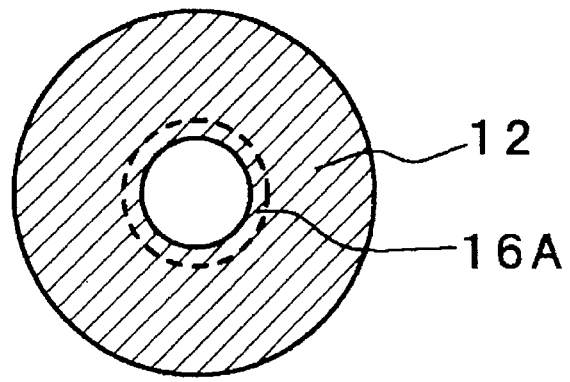

A gas-feeding nozzle used in Example 2 is shown in FIG. 6A and FIG. 6B. FIG. 6A shows a schematic cross section of the gas-feeding nozzle, taken along the axis of the gas-feeding nozzle. FIG. 6B shows a schematic cross section of the gas-feeding nozzle, taken along line VIB—VIB shown in FIG. 6A. The concavo-convex portion 16A of the gas-feeding nozzle used in this Example 2 was formed of or comprises one projected portion which extended nearly at right angles with the direction of flow of the pressurized gas. The projected portion had the form of a ring formed continuously around the circumference of the inner side wall 14 of the gas ejection portion 12. The cross-sectional form of the concavo-convex portion 16A, taken by cutting the concavo-convex portion 16A with a plane including the axis of the gas-feeding nozzle, was rectangular. The gas ejection portion 12 had an inner diameter of 5.0 mm, and the projected portion had a height of 0.2 mm and a width of 1.2 mm. The inner side wall 14 of the gas ejection portion 12 had a length of 8.0 mm, and the distance from the gas ejection outlet 20 to the center of the projected portion was 5.0 mm.

Injection molding was carried out under the same conditions as those in Example 1. When the pressure of the pressurized gas was set at three levels of 80, 130 and 180 kgf/cm$^2$-G, no blow-off phenomenon took place at any pressure level.

Example 3

Figure 7A:
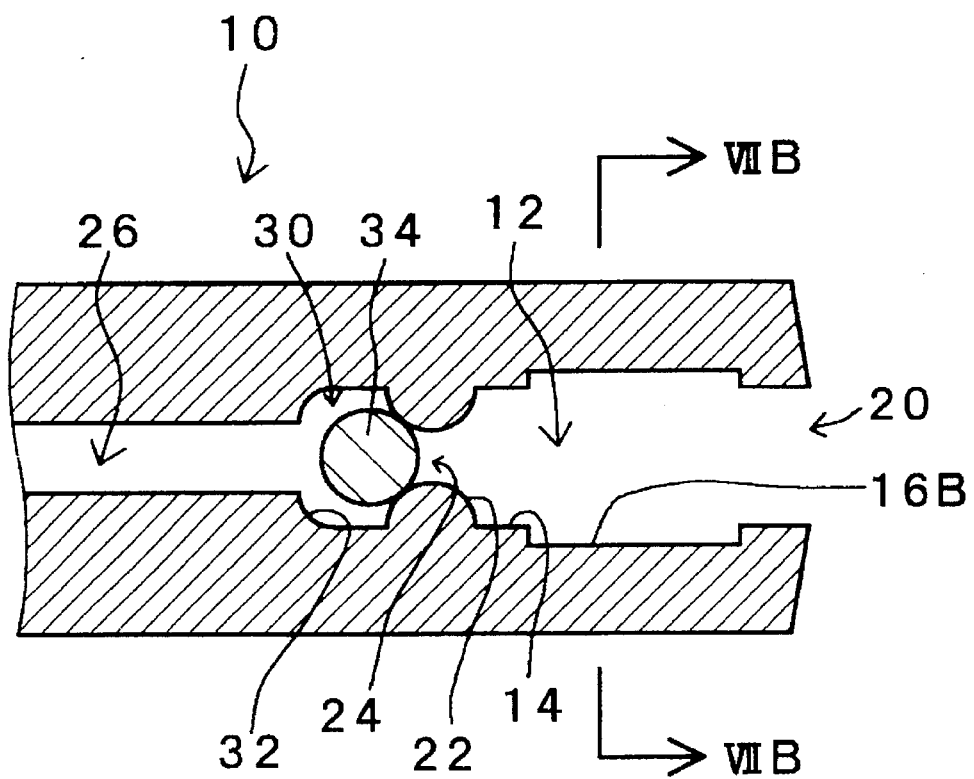
FIG. 7A and FIG. 7B are schematic cross-sectional views of a gas-feeding nozzle of Example 3.
Figure 7B:
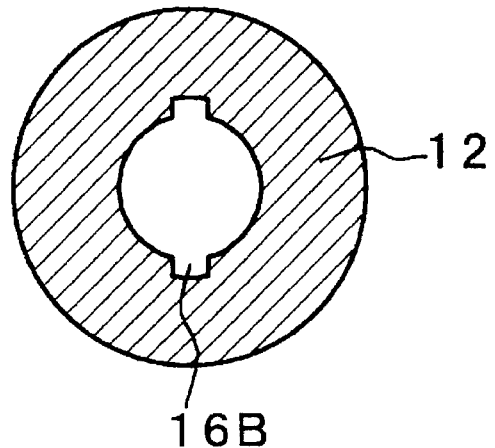

A gas-feeding nozzle used in Example 3 is shown in FIG. 7A and FIG. 7B. FIG. 7A shows a schematic cross section of the gas-feeding nozzle, taken along the axis of the gas-feeding nozzle. FIG. 7B shows a schematic cross section of the gas-feeding nozzle, taken along line VIIB—VIIB shown in FIG. 7A. The concavo-convex portions 16B of the gas-feeding nozzle 10 used in Example 3 were formed of or comprised two groove portions which extended nearly parallel with the flow direction of the pressurized gas. Each groove portion had the form of a straight line. The cross-sectional form of the concavo-convex portion 16B, taken by cutting the concavo-convex portion 16B with a plane at right angles with the axis of the gas-feeding nozzle, was rectangular. Gas ejection portion 12 had an inner diameter of 5.0 mm, and the groove portion had a depth of 0.2 mm and a width of 1.0 mm. The inner side wall 14 of the gas ejection portion 12 had a length of 10.0 mm, and the distance from a gas ejection outlet 20 to the near end of the groove portion was 1.5 mm. The groove portion had a length of 5.0 mm. The width of the groove portion may be approximately 1.0 to 2.0 mm.

Injection molding was carried out under the same conditions as those in Example 1. The pressure of the pressurized gas was set at three levels of 80, 130 and 180 kgf/cm$^2$-G. When the pressure of the pressurized gas was set at 80 kgf/cm$^2$-G, no blow-off phenomenon took place. When the pressure of the pressurized gas was set at 130 kgf/cm$^2$-G, the blow-off phenomenon sometimes took place. When the pressure of the pressurized gas was set at 180 kgf/cm$^2$-G, the blow-off phenomenon constantly took place.

Example 4

Figure 8A:
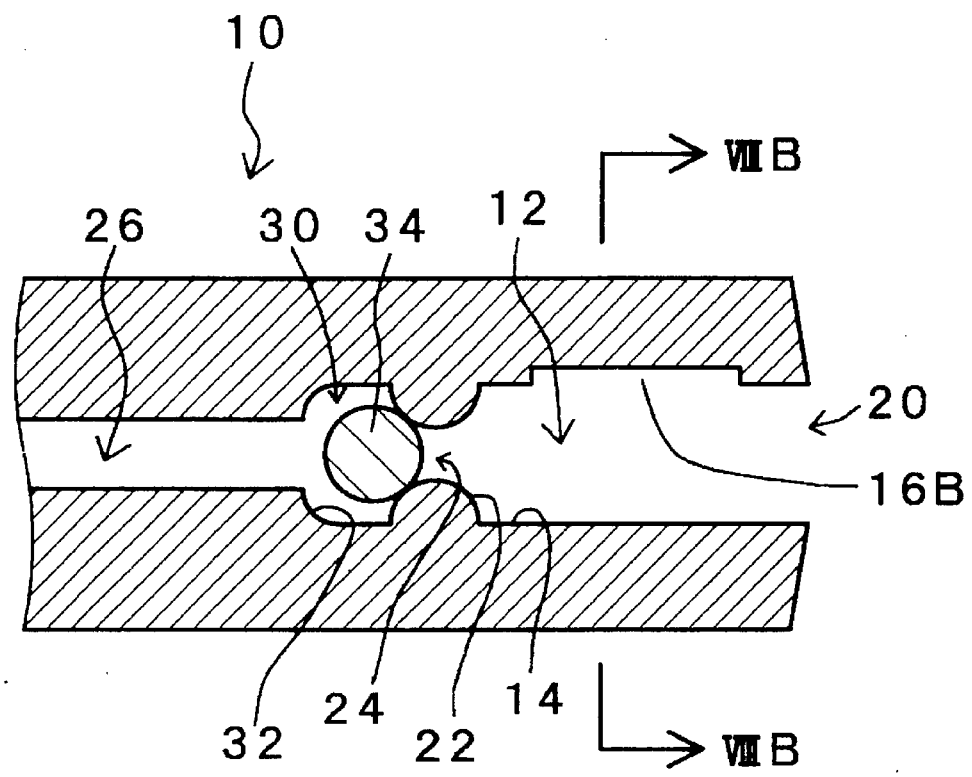
FIG. 8A and FIG. 8B are schematic cross-sectional views of a gas-feeding nozzle of Example 4.
Figure 8B:
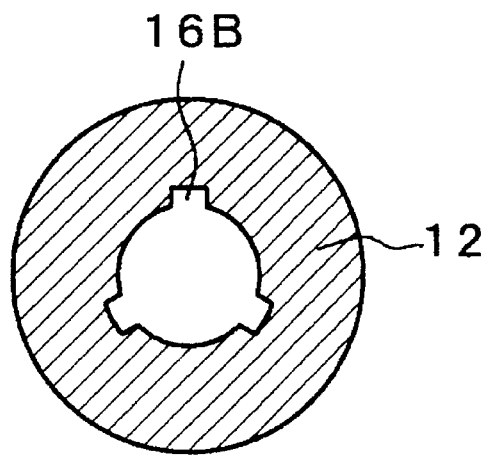

A gas-feeding nozzle used in Example 4 was a modification of the gas-feeding nozzle used in Example 3. FIG. 8A shows a schematic cross section of the gas-feeding nozzle, taken along the axis of the gas-feeding nozzle. FIG. 8B shows a schematic cross section of the gas-feeding nozzle, taken along line VIIIB—VIIIB shown in FIG. 8A. The concavo-convex portions 16B of the gas-feeding nozzle 10 used in this Example 4 were formed of or comprised three groove portions which extended nearly in parallel with the flow direction of the pressurized gas. Except for this structural modification, the gas-feeding nozzle used in Example 4 had the same structure as that of the gas-feeding nozzle used in Example 3.

Injection molding was carried out under the same conditions as those in Example 1. When the pressure of the pressurized gas was set at three levels of 80, 130 and 180 kgf/cm$^2$-G, no blow-off phenomenon took place at any pressure level.

Example 5

Figure 9A:
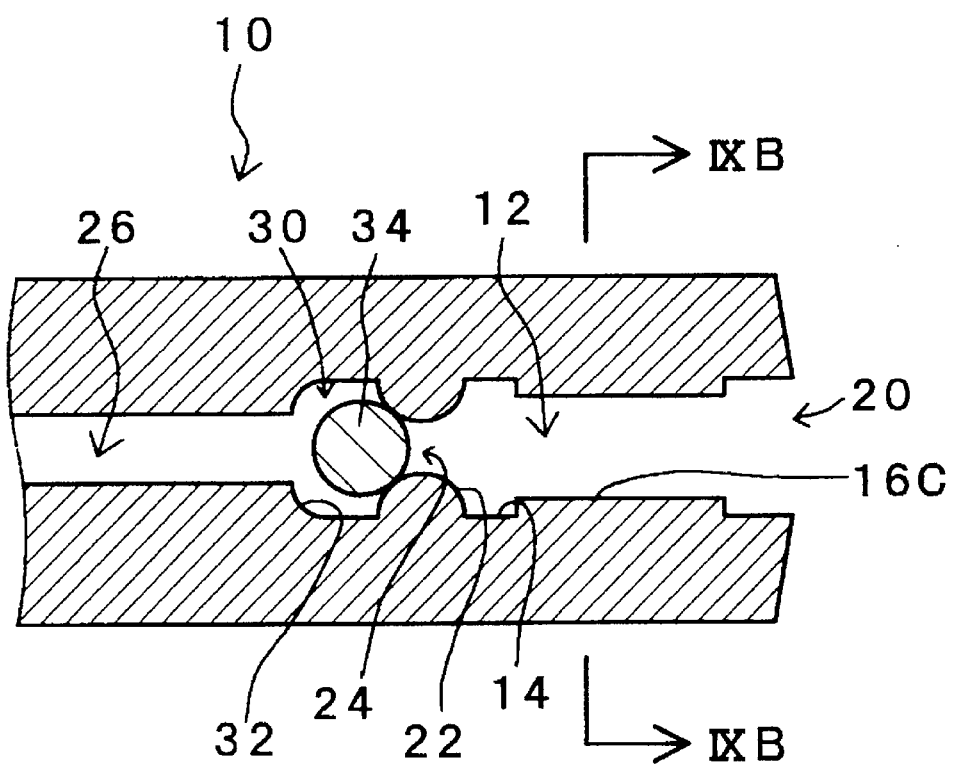
FIG. 9A and FIG. 9B are schematic cross-sectional views of a gas-feeding nozzle of Example 5.
Figure 9B:
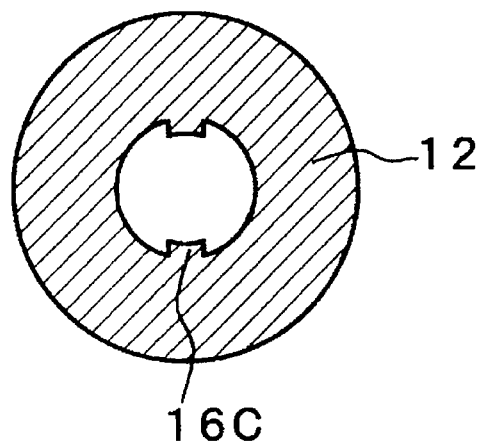

A gas-feeding nozzle used in Example 5 is shown in FIG. 9A and FIG. 9B. FIG. 9A shows a schematic cross section of the gas-feeding nozzle, taken along the axis of the gas-feeding nozzle. FIG. 9B shows a schematic cross section of the gas-feeding nozzle, taken along line IXB—IXB shown in FIG. 9A. The concavo-convex portions 16C of the gas-feeding nozzle used in Example 5 were formed of or comprised two projected portions which extended nearly parallel with the flow direction of the pressurized gas. Each projected portion had the form of a straight line. The cross-sectional form of the concavo-convex portion 16C, taken by cutting the concavo-convex portion 16C with a plane at right angles with the axis of the gas-feeding nozzle, was rectangular. The gas ejection portion 12 had an inner diameter of 5.0 mm, and the projected portion had a height of 0.2 mm and a width of 1.0 mm. The inner side wall 14 of the gas ejection portion 12 had a length of 10.0 mm, and the distance from the gas ejection outlet 20 to the near end of the projected portion was 1.5 mm. The projected portion had a length of 4.0 mm. The width of the projected portion may be approximately 1.0 to 2.0 mm.

Injection molding was carried out under the same conditions as those in Example 1. The pressure of the pressurized gas was set at three levels of 80, 130 and 180 kgf/cm$^2$-G. When the pressure of the pressurized gas was set at 80 kgf/cm$^2$-G, no blow-off phenomenon took place. When the pressure of the pressurized gas was set at 130 kgf/cm$^2$-G, the blow-off phenomenon sometimes took place. When the pressure of the pressurized gas was set at 180 kgf/cm$^2$-G, the blow-off phenomenon constantly took place.

Example 6

Figure 10A:
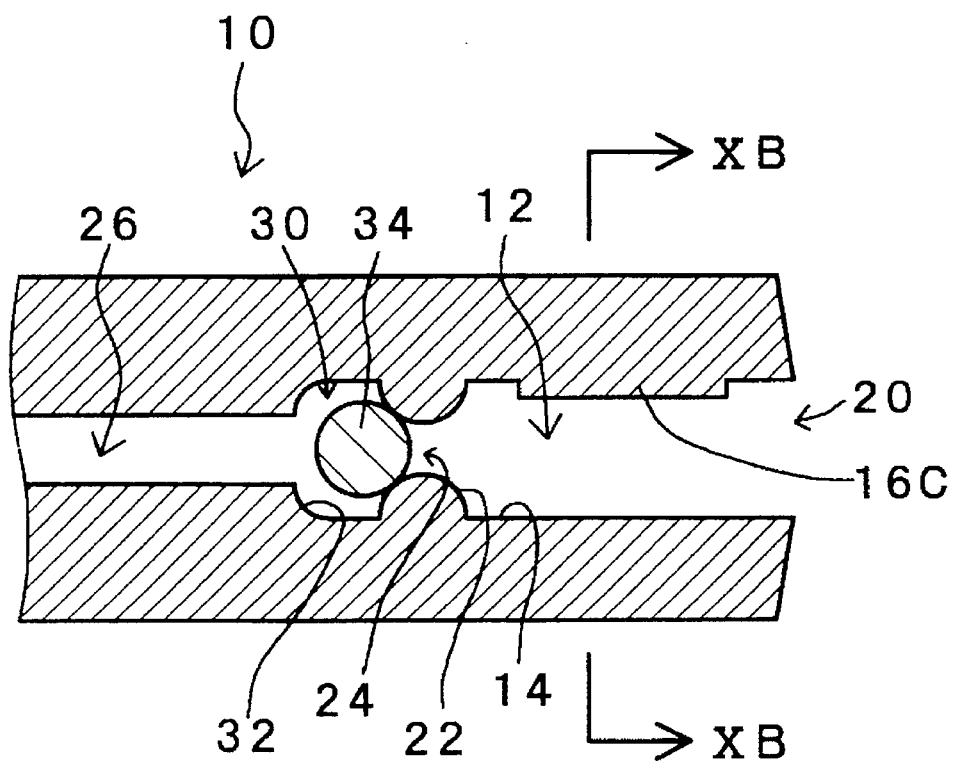
FIG. 10A and FIG. 10B are schematic cross-sectional views of a gas-feeding nozzle of Example 6.
Figure 10B:
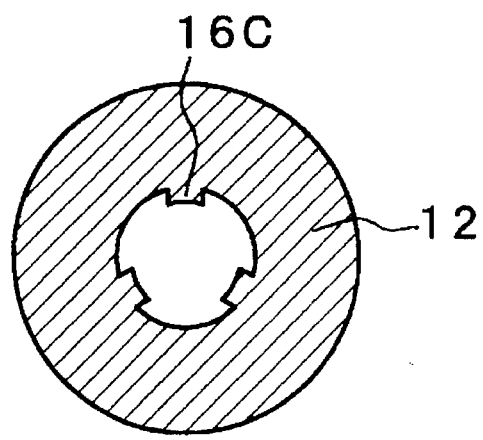

A gas-feeding nozzle used in Example 6 was a modification of the gas-feeding nozzle used in Example 5. FIG. 10A shows a schematic cross section of the gas-feeding nozzle, taken along the axis of the gas-feeding nozzle. FIG. 10B shows a schematic cross section of the gas-feeding nozzle, taken along line XB—XB shown in FIG. 10A. The concavo-convex portions 16C of the gas-feeding nozzle used in Example 6 were formed of or comprised three projected portions which extended nearly parallel with the flow direction of the pressurized gas. Except for this structural modification, the gas-feeding nozzle used in Example 6 had the same structure as that of the gas-feeding nozzle used in Example 5.

Injection molding was carried out under the same conditions as those in Example 1. When the pressure of the pressurized gas was set at three levels of 80, 130 and 180 kgf/cm$^2$-G, no blow-off phenomenon took place at any pressure level.

Example 7

Figure 11A:
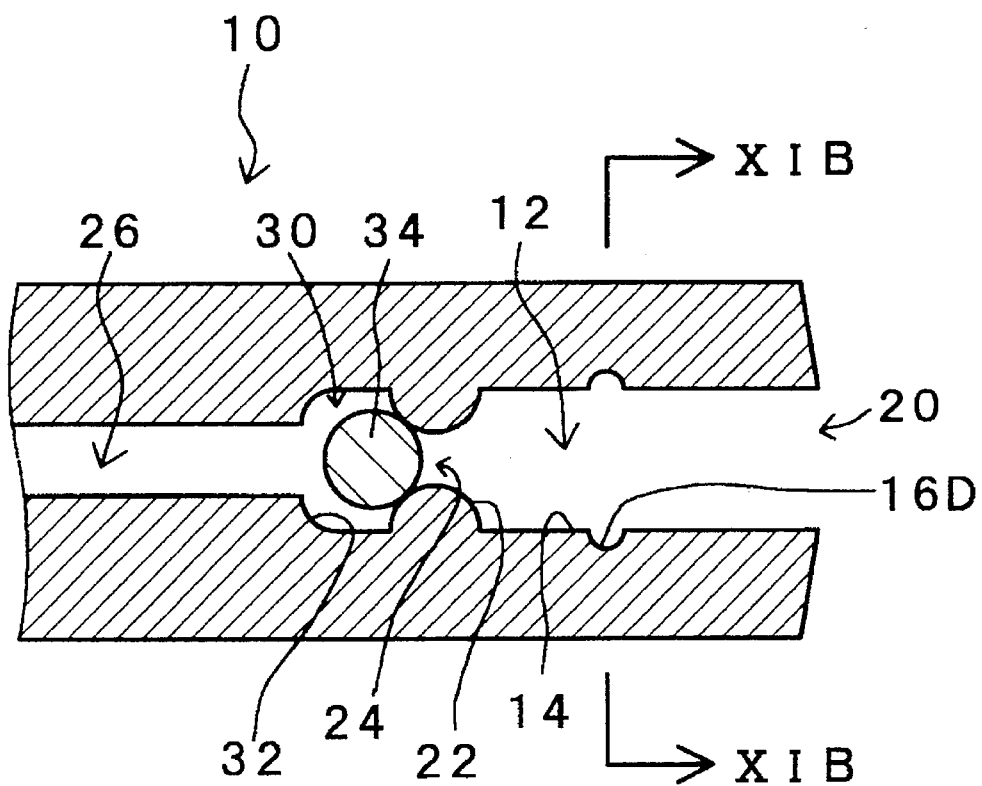
FIG. 11A and FIG. 11B are schematic cross-sectional views of a gas-feeding nozzle of Example 7.
Figure 11B:
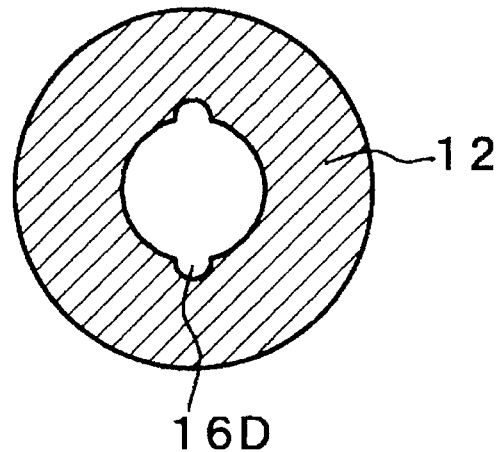

A gas-feeding nozzle used in Example 7 is shown in FIG. 11A and FIG. 11B. FIG. 11A shows a schematic cross section of the gas-feeding nozzle, taken along the axis of the gas-feeding nozzle. FIG. 11B shows a schematic cross section of the gas-feeding nozzle, taken along line XIB—XIB shown in FIG. 11A. The concavo-convex portions 16D of the gas-feeding nozzle used in Example 7 were formed of or comprised two pits or recesses. The pits were arranged at intervals of 180 degrees. The gas ejection portion 12 had an inner diameter of 5.0 mm, and the pits had a depth of 0.5 mm and a diameter of 2.0 mm. Each pit had a plane-sectional form of a circle and a cross-sectional form of a semi-circle. The inner side wall 14 of the gas ejection portion 12 had a length of 8.0 mm, and the distance from the gas ejection outlet 20 to the center of the pit was 6.0 mm. The pit may have a depth of 0.1 to 1.5 mm and a diameter of 1.0 to 3.0 mm.

Injection molding was carried out under the same conditions as those in Example 1. The pressure of the pressurized gas was set at three levels of 80, 130 and 180 kgf/cm$^2$-G. When the pressure of the pressurized gas was set at 80 kgf/cm$^2$-G, no blow-off phenomenon took place. When the pressure of the pressurized gas was set at 130 kgf/cm$^2$-G, the blow-off phenomenon sometimes took place. When the pressure of the pressurized gas was set at 180 kgf/cm$^2$-G, the blow-off phenomenon constantly took place.

Example 8

Figure 12A:
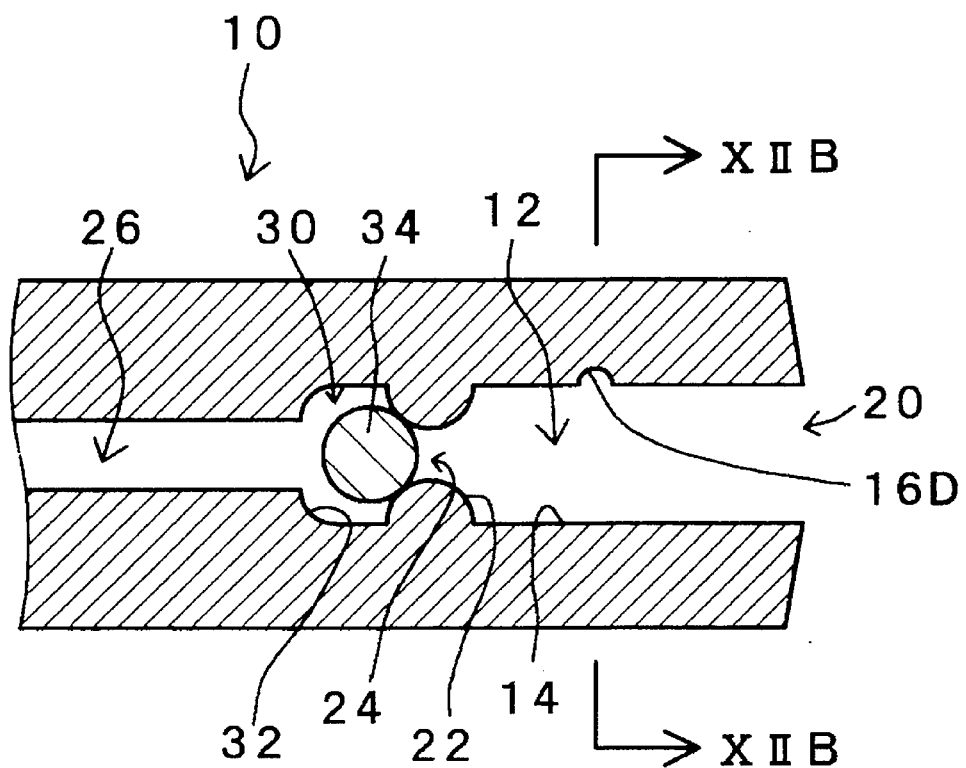
FIG. 12A and FIG. 12B are schematic cross-sectional views of a gas-feeding nozzle of Example 8.
Figure 12B:
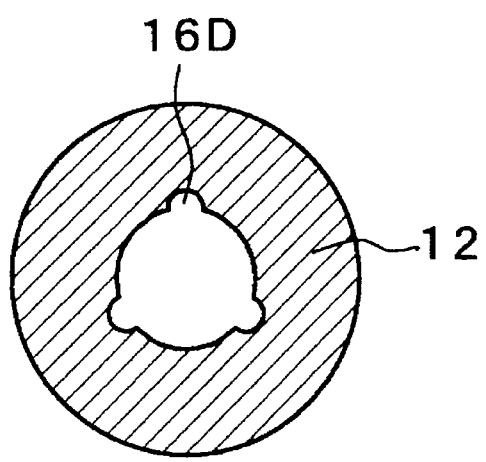

A gas-feeding nozzle used in Example 8 was a modification of the gas-feeding nozzle used in Example 7. FIG. 12A shows a schematic cross section of the gas-feeding nozzle, taken along the axis of the gas-feeding nozzle. FIG. 12B shows a schematic cross section of the gas-feeding nozzle, taken along line XIIB—XIIB shown in FIG. 12A. The concavo-convex portions 16D of the gas-feeding nozzle used in this Example 8 were formed of or comprised three pits or recesses which were arranged at intervals of 120 degrees. Except for this structural modification, the gas-feeding nozzle used in Example 8 had the same structure as that of the gas-feeding nozzle used in Example 7.

Injection molding was carried out under the same conditions as those in Example 1. When the pressure of the pressurized gas was set at three levels of 80, 130 and 180 kgf/cm$^2$-G, no blow-off phenomenon took place at any pressure level.

Example 9

Figure 13A:
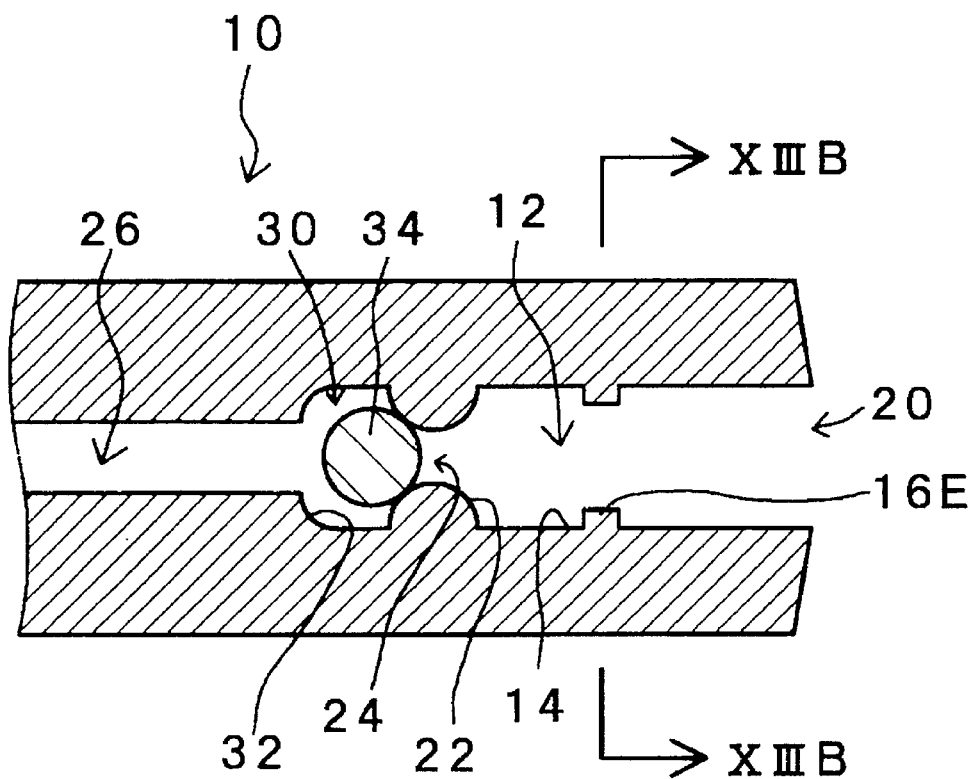
FIG. 13A and FIG. 13B are schematic cross-sectional views of a gas-feeding nozzle of Example 9.
Figure 13B:
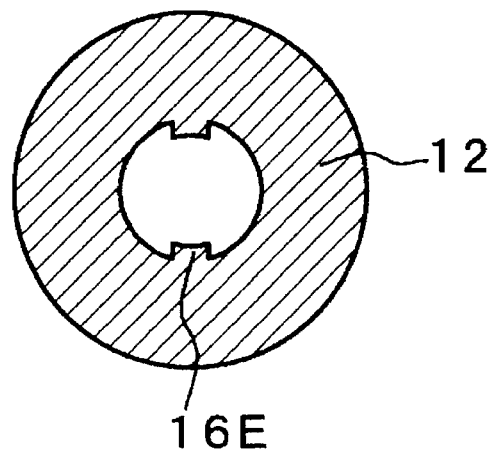

A gas-feeding nozzle used in Example 9 is shown in FIG. 13A and FIG. 13B. FIG. 13A shows a schematic cross section of the gas-feeding nozzle, taken along the axis of the gas-feeding nozzle. FIG. 13B shows a schematic cross section of the gas-feeding nozzle, taken along line XIIIB—XIIIB shown in FIG. 13A. The concavo-convex portions 16E of the gas-feeding nozzle used in Example 9 were formed of or comprised two projections. The projections were arranged at intervals of 180 degrees. The gas ejection portion 12 had an inner diameter of 5.0 mm, and the projections had a height of 0.2 mm and a diameter of 1.0 mm. Each projection had the plane-sectional form of a circle and the cross-sectional form of a rectangle. The inner side wall 14 of the gas ejection portion 12 had a length of 10.0 mm, and the distance from the gas ejection outlet 20 to the center of the projection was 5.0 mm. The projection may have a height of 0.1 to 1.5 mm and a diameter of 1.0 to 3.0 mm.

Injection molding was carried out under the same conditions as those in Example 1. The pressure of the pressurized gas was set at three levels of 80, 130 and 180 kgf/cm$^2$-G. When the pressure of the pressurized gas was set at 80 kgf/cm$^2$-G, no blow-off phenomenon took place. When the pressure of the pressurized gas was set at 130 kgf/cm$^2$-G, the blow-off phenomenon sometimes took place. When the pressure of the pressurized gas was set at 180 kgf/cm$^2$-G, the blow-off phenomenon constantly took place.

Example 10

Figure 14A:
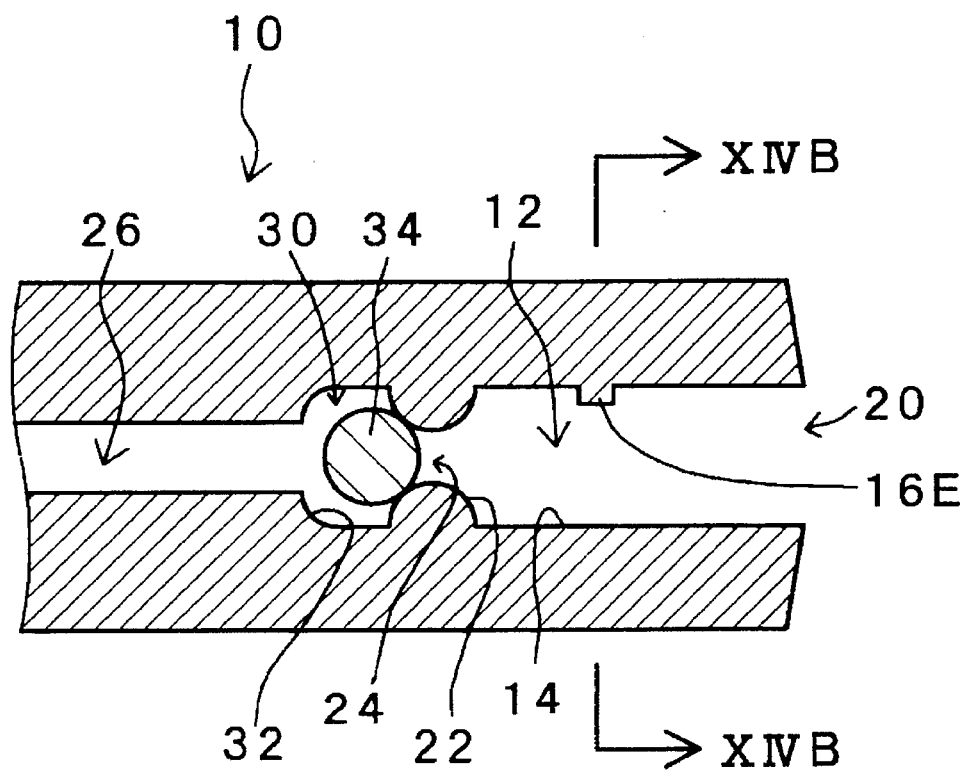
FIG. 14A and FIG. 14B are schematic cross-sectional views of a gas-feeding nozzle of Example 10.
Figure 14B:
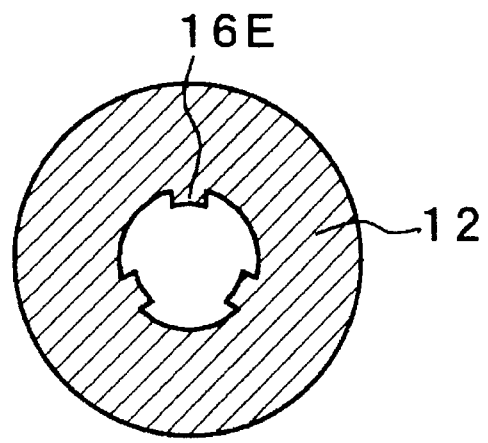

A gas-feeding nozzle used in Example 10 was a modification of the gas-feeding nozzle used in Example 9. FIG. 14A shows a schematic cross section of the gas-feeding nozzle, taken along the axis of the gas-feeding nozzle. FIG. 14 shows a schematic cross section of the gas-feeding nozzle, taken along line XIV—XIV shown in FIG. 14A. The concavo-convex portions 16E of the gas-feeding nozzle used in Example 10 were formed of or comprised three projections which were arranged at intervals of 120 degrees. Except for this structural modification, the gas-feeding nozzle used in Example 10 had the same structure as that of the gas-feeding nozzle used in Example 9.

Injection molding was carried out under the same conditions as those in Example 1. When the pressure of the pressurized gas was set at three levels of 80, 130 and 180 kgf/cm$^2$-G, no blow-off phenomenon took place at any pressure level.

Example 11

Figure 15:
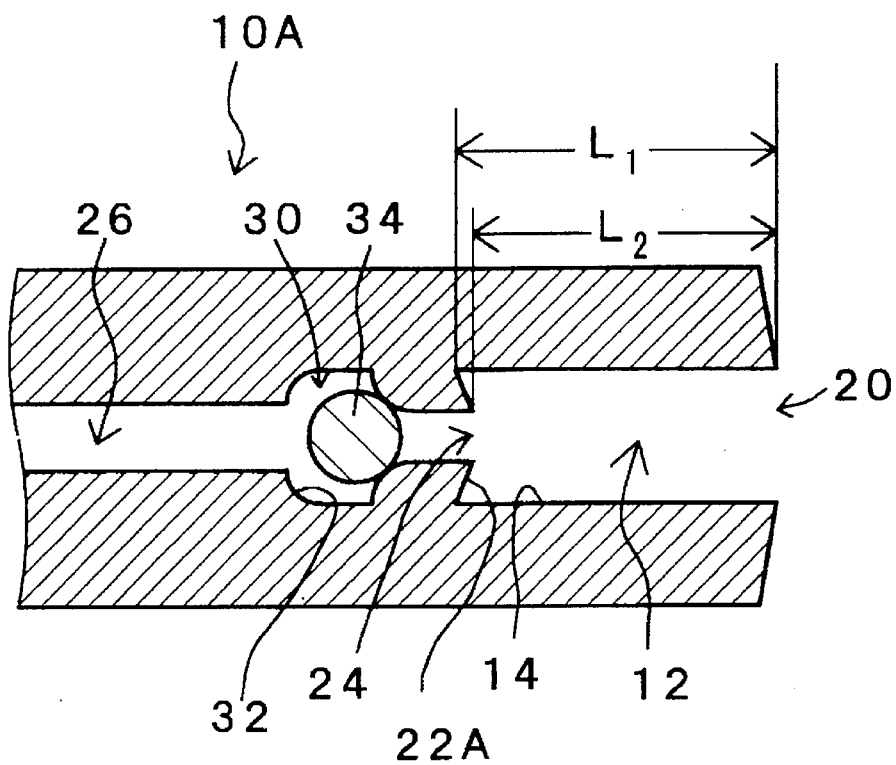
FIG. 15 is a schematic cross-sectional view of a gas-feeding nozzle of Example 11.

A gas-feeding nozzle 10A used in Example 11 according to a second aspect of the present invention is shown in FIG. 15, which shows a schematic cross section of the gas-feeding nozzle, taken along the axis of the gas-feeding nozzle. In the gas-feeding nozzle 10A of Example 11, a top or forward portion of the gas-feeding nozzle forms a gas ejection portion 12, and the gas ejection portion 12 comprises an inner side wall 14 along a direction of flow of pressurized gas, a gas ejection outlet 20 provided in one end of the inner side wall 14 for outletting the pressurized gas, a bottom rearward wall 22A extending from the other end of the inner side wall and a gas introducing port 24 formed in the bottom wall 22A. The length ($L_1$) of the inner side wall 14 is greater than the distance ($L_2$) from the gas introducing port 24 to the gas outlet 20. In this Example 11, the inner diameter of the gas ejection portion 12 was 5.0 mm, $L_1$ was 10.0 mm, and $L_2$ was 9.0 mm. The cross-sectional form of the forward surface of the rearward wall, taken by cutting the rearward wall with a plane including the axis of the gas-feeding nozzle, was straight. In Example 11, the surface of the inner side wall 14 is parallel with the axis of the gas-feeding nozzle.

Injection molding was carried out under the same conditions as those in Example 1. When the pressure of the pressurized gas was set at three levels of 80, 130 and 180 kgf/cm$^2$-G, no blow-off phenomenon took place at any pressure level since the resin filled near the wall 22A had a so-called anchor effect, i.e. was anchored to the nozzle.

Example 12

Figure 16:
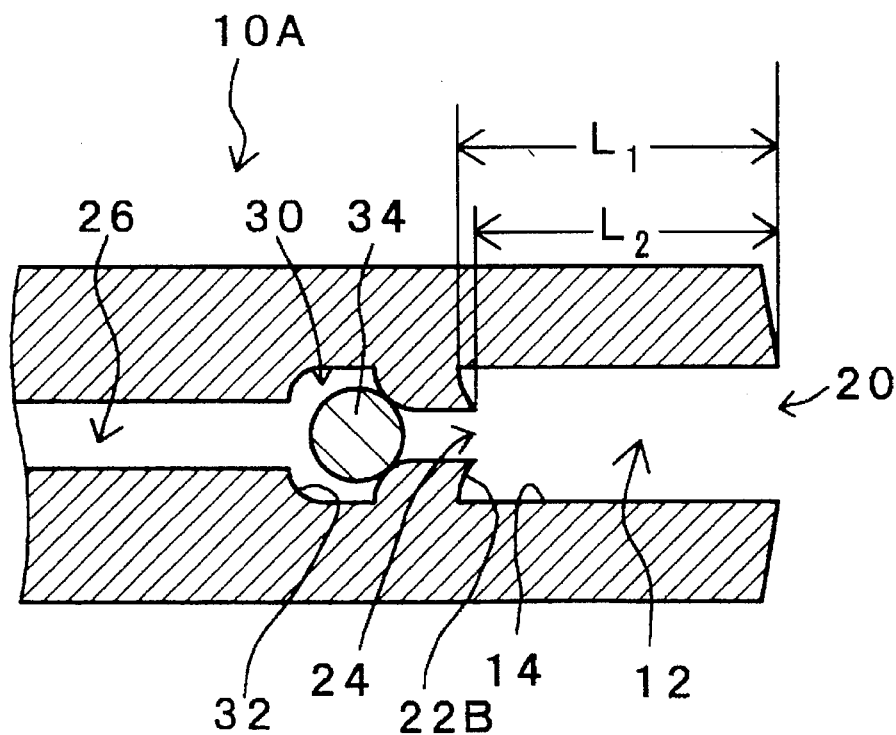
FIG. 16 is a schematic cross-sectional view of a gas-feeding nozzle of Example 12.

A gas-feeding nozzle 10A used in Example 12 was a modification of the gas-feeding nozzle used in Example 11. FIG. 16 shows a schematic cross section of the gas-feeding nozzle, taken along the axis of the gas-feeding nozzle. The gas-feeding nozzle 10A used in Example 12 was structurally the same as the gas-feeding nozzle used in Example 11 except that the cross-sectional form of the forward surface of the rearward wall 22B of the gas-feeding nozzle 10A used in Example 12, taken by cutting the wall 22B with a plane including the axis of the gas-feeding nozzle, was curved. Injection molding was carried out under the same conditions as those in Example 1. When the pressure of the pressurized gas was set at three levels of 80, 130 and 180 kgf/cm$^2$-G, no blow-off phenomenon took place at any pressure level since the resin filled near the wall 22B had a so-called anchor effect.

Tables 1, 2, 3 and 4 summarize the results concerning the blow-off phenomenon in the Examples and in the Comparative Example. In such Tables, "A" means that no blow-off phenomenon took place, "B" means that the blow-off phenomenon sometimes took place, and "C" means that the blow-off phenomenon constantly took place. In the Tables, further, the unit of the pressurized gas is kgf/cm$^2$-G.

As explained above, in the gas-feeding nozzle of the present invention, the concavo-convex portion(s) is (are) formed on the inner side wall of the gas ejection portion, or the length of the inner side wall is arranged to be greater than the distance from the gas introducing port to the gas ejection outlet. Therefore, when the pressurized gas is introduced into the molten resin injected in the cavity of the mold, the blowing off of resin filled in the gas ejection portion by the pressurized gas can be effectively prevented. As a result, the pressurized gas does not leak out of the molten resin, but can be smoothly and reliably introduced into the molten resin in the cavity of the mold, and injection molded articles having a hollow structure can be produced at a stable continuous cycle.

TABLE 1

| Example No. | 1 | 2 | 3 | 4 |
|---|---|---|---|---|
| Form of concavo-convex portion | 1 groove portion in the direction of circumference of inner side wall | 1 projected portion in the direction of circumference of inner side wall | 2 groove portions in the flow direction of gas | 3 groove portions in the flow direction of gas |
| Pressure of pressurized gas | | | | |
| 80 | A | A | A | A |
| 130 | A | A | B | A |
| 180 | A | A | C | A |
| Reference drawings | FIG. 1 | FIG. 6 | FIG. 7 | Fig. 8 |

TABLE 2

| Example No. | 5 | 6 | 7 | 8 |
|---|---|---|---|---|
| Form of concavo-convex portion | 2 projected portions in the flow direction of gas | 3 projected portions in the flow direction of gas | 2 pits | 3 pits |
| Pressure of pressurized gas | | | | |
| 80 | A | A | A | A |
| 130 | B | A | B | A |
| 180 | C | A | C | A |
| Reference drawings | FIG. 9 | FIG. 10 | FIG. 11 | FIG. 12 |

TABLE 3

| Example No. | 9 | 10 | 11 | 12 |
|---|---|---|---|---|
| Form of concavo-convex portion | 2 projections | 3 projections | cross-sectionally straight rear wall | cross-sectionally curved rear wall |
| Pressure of pressurized gas | | | | |
| 80 | A | A | A | A |
| 130 | B | A | A | A |
| 180 | C | A | A | A |
| Reference drawings | FIG. 13 | FIG. 14 | FIG. 15 | FIG. 16 |

TABLE 4

Figure 17:
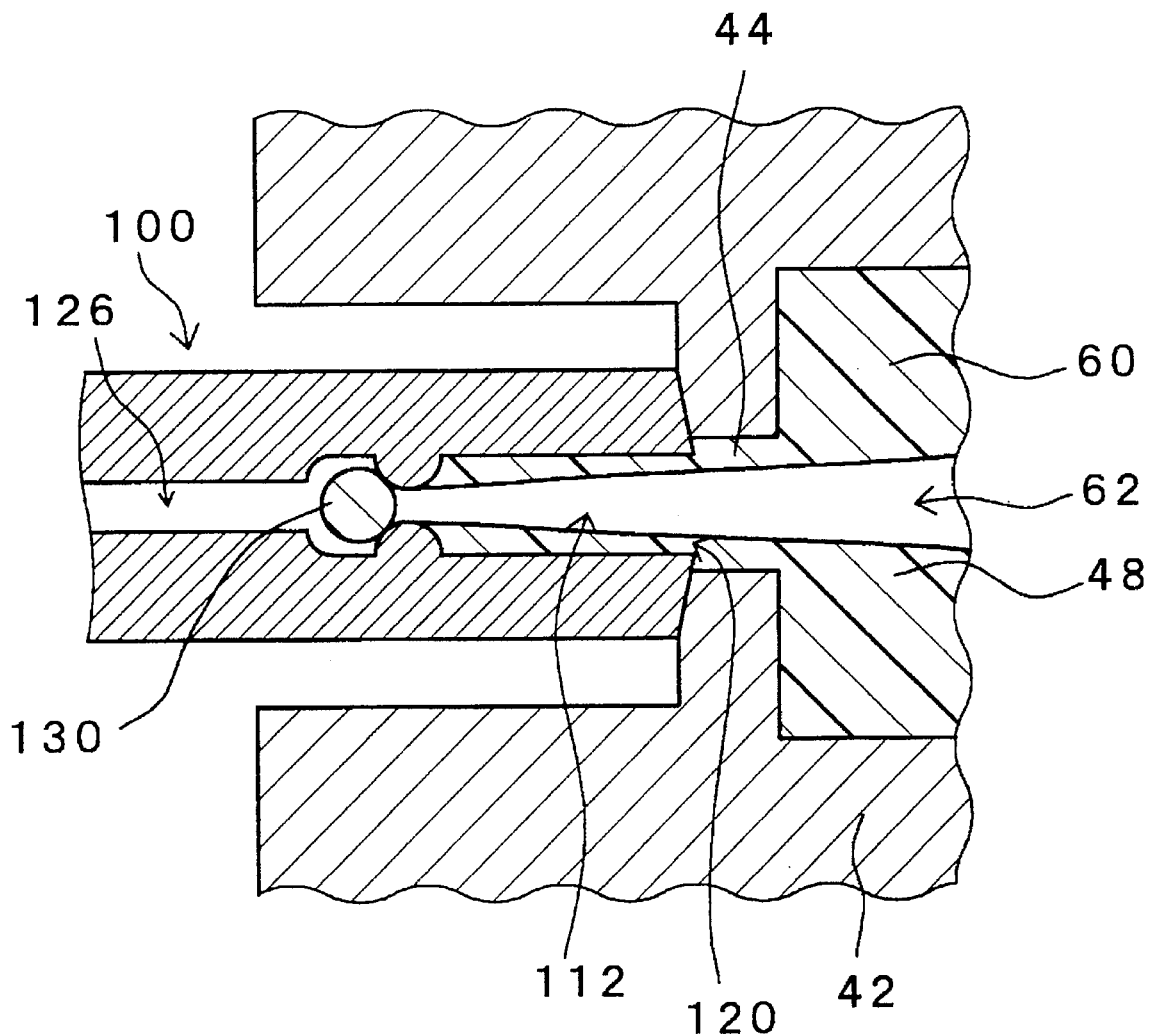
FIG. 17 is an enlarged schematic cross-sectional view of a conventional gas-feeding nozzle and a mold, showing a state in which pressurized gas is being introduced.
Figure 18:
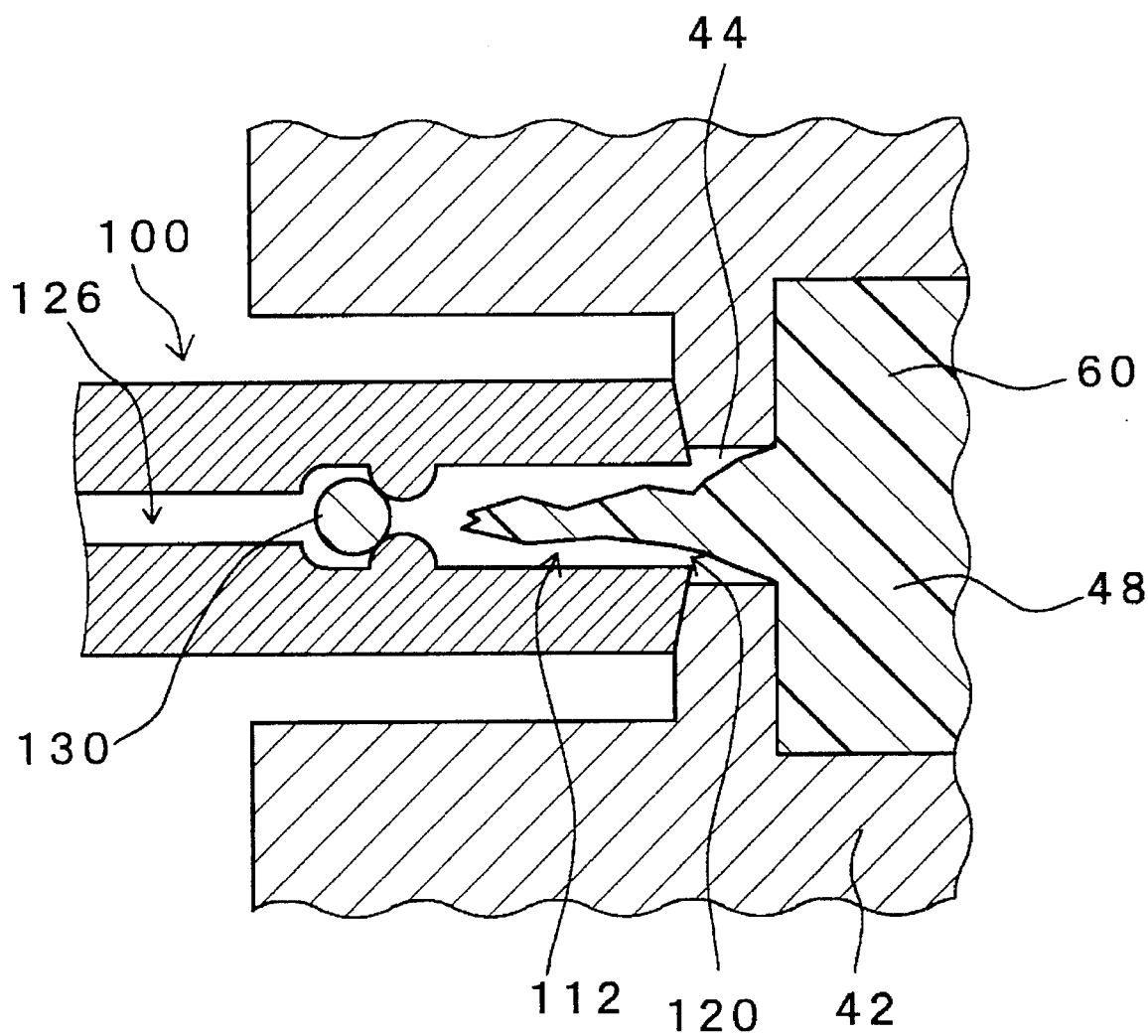
FIG. 18 is a schematic cross-sectional view for explaining the blow-off phenomenon during the introduction of pressurized gas when such conventional gas-feeding nozzle is used.

| Comparative Example No. | 1 |
| --- | --- |
| Pressure of pressurized gas | |
| 80 | B |
| 130 | C |
| 180 | C |
| Reference drawing | FIG. 17 |

What is claimed is:

1. A gas-feeding nozzle, to be used with a mold to be attached to an injection molding machine, for introducing pressurized gas into molten resin to be injected into a cavity of the mold by the injection molding machine, to thereby enable production of a molded resin article having a hollow structure, said nozzle comprising:

a member having therethrough a passage including an upstream pressurized gas introduction portion, a downstream pressurized gas ejection portion, and a gas introducing port leading from said gas introduction portion to said gas ejection portion;

said gas ejection portion being defined by an inner side wall of said member and having a gas ejection port at a downstream end of said member;

said gas introducing port extending through a rear wall defining an upstream end of said gas ejection portion, said rear wall extending radially inwardly from said inner side wall;

whereby said member is positionable with said gas ejection portion in communication with the cavity in the mold during injection of resin therein by the injection molding machine, during which resin passes into said gas ejection portion and undergoes solidification therein;

a non-return valve in said passage upstream of said gas introducing port for preventing resin from flowing from said gas ejection portion to said gas introduction portion while enabling passage of pressurized gas from said gas introduction portion into said gas ejection portion; and said inner side wall of said gas ejection portion having a concavo-convex structure for preventing blow-off of resin in said gas ejection portion during passage of pressurized gas therethrough.

2. A gas-feeding nozzle as claimed in claim 1, wherein said concavo-convex structure comprises at least one groove formed in or at least one projection extending from said inner side wall.

3. A gas-feeding nozzle as claimed in claim 2, wherein said groove or projection comprises a circumferential groove or projection, respectively.

4. A gas-feeding nozzle as claimed in claim 2, wherein said at least one groove or projection extends substantially parallel to a direction of flow of pressurized gas through said gas ejection portion.

5. A gas-feeding nozzle as claimed in claim 1, wherein said concavo-convex structure comprises at least one recess formed in or at least one projection extending from said inner side wall.

6. A gas-assisted injection molding apparatus including a mold having therein a cavity, molten resin injecting means for injecting molten resin into said cavity, and a gas-feeding nozzle for introducing pressurized gas into the molten resin in said cavity to enable production of a molded resin article having a hollow structure, said gas-feeding nozzle being located at a position separate and spaced from said molten resin injecting means and operable to inject gas into said cavity at a location separate from a location of injection therein of the molten resin by said molten resin injecting means, said gas-feeding nozzle comprising:

a member having therethrough a passage including an upstream pressurized gas introduction portion, a downstream pressurized gas ejection portion, and a gas introducing port leading from said gas introduction portion to said gas ejection portion;

said gas ejection portion being defined by an inner side wall of said member and having a gas ejection port at a downstream end of said member;

said gas introducing port extending through a rear wall defining an upstream end of said gas ejection portion, said rear wall extending radially inwardly from said inner side wall;

whereby said member is positionable with said gas ejection portion in communication with said cavity in said mold during injection of resin therein by molten resin injecting means, during which resin passes into said gas ejection portion and undergoes solidification therein;

a non-return valve in said passage upstream of said gas introducing port for preventing resin from flowing from said gas ejection portion to said gas introduction portion while enabling passage of pressurized gas from said gas introduction portion into said gas ejection portion; and said inner side wall of said gas ejection portion having a concavo-convex structure for preventing blow-off of resin in said gas ejection portion during passage of pressurized gas therethrough.

7. An apparatus as claimed in claim 6, wherein said concavo-convex structure comprises at least one groove formed in or at least one projection extending from said inner side wall.

8. An apparatus as claimed in claim 7, wherein said groove or projection comprises a circumferential groove or projection, respectively.

9. An apparatus as claimed in claim 7, wherein said at least one groove or projection extends substantially parallel to a direction of flow of pressurized gas through said gas ejection portion.

10. An apparatus as claimed in claim 6, wherein said concavo-convex structure comprises at least one recess formed in or at least one projection extending from said inner side wall.

11. A gas-assisted injection molding method employing an apparatus including a mold having therein a cavity, molten resin injecting means for injecting molten resin into said cavity, and a gas-feeding nozzle for introducing pressurized gas into said molten resin in said cavity to produce a molded resin article having a hollow structure, said gas-feeding nozzle being located at a position separate and spaced from said molten resin injecting means and comprising a member having therethrough a passage including an upstream pressurized gas introduction portion, a downstream pressurized gas ejection portion, and a gas introducing port leading from said gas introduction portion to said gas ejection portion, said gas ejection portion being defined by an inner side wall of said member and having a gas ejection port at a downstream end of said member, said gas introducing port extending through a rear wall defining an upstream end of said gas ejection portion, said rear wall extending radially inwardly from said inner side wall, a non-return valve in said passage upstream of said gas introducing port, and said inner side wall of said gas ejection portion having a concavo-convex structure, said method comprising:

positioning said gas-feeding nozzle at said position with said gas ejection portion in communication with said cavity;

injecting molten resin into said cavity by said injecting means at a location separate and spaced from said position, and allowing molten resin to pass from said cavity at said position into said gas ejection portion and to accumulate and undergo solidification therein, while preventing flow of said molten resin from said gas ejection portion to said gas introduction portion by said non-return valve; and passing pressurized gas through said passage and said non-return valve and introducing said pressurized gas from said gas ejection portion into said molten resin in said cavity, while preventing blow-off of said resin in said gas ejection portion by maintaining engagement of said concavo-convex structure with said resin in said gas ejection portion;

thereby forming said molded resin article having a hollow structure.

12. A method as claimed in claim 11, comprising providing said concavo-convex structure as at least one groove formed in or at least one projection extending from said inner side wall.

13. A method as claimed in claim 12, comprising providing said groove or projection as a circumferential groove or projection, respectively.

14. A method as claimed in claim 12, comprising providing said at least one groove or projection to extend substantially parallel to a direction of flow of said pressurized gas through said gas ejection portion.

15. A method as claimed in claim 11, comprising providing said concavo-convex structure as at least one recess formed in or at least one projection extending from said inner side wall.

\* \* \* \* \*